(12) United States Patent
Hahnel et al.

(10) Patent No.: US 6,817,505 B2
(45) Date of Patent: Nov. 16, 2004

(54) METHOD AND DEVICE FOR FRACTURE-SPLITTING A WORKPIECE

(75) Inventors: Michael Hahnel, Essingen (DE); Horst Wisniewski, Reutlingen (DE)

(73) Assignee: Alfing Kessler Sondermaschinen GmbH, Aalen (DE)

(*) Notice: Subject to any disclaimer, the term of this patent is extended or adjusted under 35 U.S.C. 154(b) by 0 days.

(21) Appl. No.: 10/756,722

(22) Filed: Jan. 13, 2004

(65) Prior Publication Data

US 2004/0144826 A1 Jul. 29, 2004

Related U.S. Application Data

(62) Division of application No. 09/965,319, filed as application No. PCT/EP00/03577 on Apr. 19, 2000, now Pat. No. 6,698,637.

(30) Foreign Application Priority Data

Apr. 21, 1999 (DE) .......................................... 199 18 063

(51) Int. Cl.$^7$ ................................................ B26F 3/00
(52) U.S. Cl. .............................. 225/2; 225/96; 225/97; 225/103; 29/888.09
(58) Field of Search .............................. 225/2, 93, 96, 225/96.5, 97, 100, 101, 103–105; 29/888.09, 413, 416

(56) References Cited

U.S. PATENT DOCUMENTS 4,569,109 A * 2/1986 Fetouh ..................... 29/888.09

| | | |
|---|---|---|
| 4,684,267 A | 8/1987 | Fetouh |
| 5,169,046 A | 12/1992 | Miessen et al. |
| 5,320,265 A | 6/1994 | Becker |
| 5,503,317 A | 4/1996 | Jones et al. |
| 5,716,145 A | 2/1998 | Eidenbock et al. |
| 5,911,349 A | 6/1999 | Wiesemann et al. |
| 6,145,574 A | 11/2000 | Luchner et al. |
| 6,641,016 B2 | 11/2003 | Hahnel et al. |

FOREIGN PATENT DOCUMENTS

| DE | 19547388 A1 | 6/1997 |
|---|---|---|
| WO | WO 98/33616 A1 | 8/1998 |

* cited by examiner

*Primary Examiner*—Stephen Choi
(74) *Attorney, Agent, or Firm*—Wolf, Greenfield & Sacks, P.C.

(57) ABSTRACT

The invention relates to a method for fracture-separating a workpiece which comprises one or more ring-shaped workpiece sections that are aligned axially one behind the other. The method comprises the following steps: fixing the workpiece for the fracture-separation process; axially introducing at least one expansion device into at least one borehole which is formed in each ring-shaped workpiece section; creating at least one fracture notch in at least one borehole during and/or after the axial introduction of the expansion device; and expanding the expansion device for fracture-separating at least one ring-shaped workpiece section. The invention also relates to a device which is suitable for carrying out said method.

16 Claims, 3 Drawing Sheets

US 6,817,505 B2

METHOD AND DEVICE FOR FRACTURE-SPLITTING A WORKPIECE

CROSS REFERENCE TO RELATED APPLICATIONS

This application is a division of U.S. application Ser. No. 09/965,319, filed Sep. 27, 2001, now U.S. Pat. No. 6,698,637, which is a continuation of prior application no. PCT/EP00/03577, filed on Apr. 19, 2000, and which is hereby incorporated by reference.

TECHNICAL FIELD

The invention relates to a method and a device for fracture-splitting a workpiece comprising one or more ring-shaped workpiece sections axially aligned in sequence.

PRIOR ART

Known from DE 197 04 131 A1 is a method for fracture-splitting a workpiece comprising one or more ring-shaped workpiece sections axially aligned in sequence, the method comprising the following steps: firstly, producing two diametrally opposed fracture notches each in the bores formed by the ring-shaped workpiece sections, this usually being done in a machining station provided specially for this purpose. After the fracture notches have been produced, the workpiece is removed from the machining station, transferred to a special clamping and supporting fixture where it is located for the actual fracture-splitting step. Between removal and location, the workpiece may be or must be buffered for a certain time before an expander means is introduced axially into the bores formed by the ring-shaped workpiece sections and expanded to fracture-split at least one ring-shaped workpiece section. The device as disclosed in DE 197 04 131 A1 for implementing the method comprises a clamping and supporting fixture for locating the workpiece and an expander means for insertion into and expanding axially the bores formed by the ring-shaped workpiece sections.

A comparable method and a comparable device are each disclosed furthermore in WO 95/28248, EP 0 167 320 B1 and U.S. Pat. No. 4,684,267.

SUMMARY OF THE INVENTION

The invention is based on the technical objective of providing a method for fracture-splitting a workpiece as well as a device for fracture-splitting a workpiece suitable for such a method with which machining the workpiece is further rationalized by ways and means as simply and effectively as possible whilst enabling the technical complications in production of the device to be reduced.

The technical objective as cited above is achieved by a method in accordance with the invention having the features as set forth in claim 1.

This method for fracture-splitting a workpiece comprising one or more ring-shaped workpiece sections axially aligned in sequence comprises the following steps: locating the workpiece for fracture-splitting; axially inserting at least one expander means into at least one bore formed by each ring-shaped workpiece section; producing at least one fracture notch in at least one bore during and/or after axial insertion of the expander means; and expanding the expander means to fracture-split at least one ring-shaped workpiece section.

Producing the fracture notch is done preferably with a parting means as detailed in the following in conjunction with the description of the device in accordance with the invention. Producing the fracture notch in this arrangement may be implemented both from only one and from both axial sides of the bore formed by each ring-shaped workpiece section. When two expander means are used in the method in accordance with the invention, it is in addition likewise possible to insert the expander means from two opposite axial sides into one or more bores formed by each ring-shaped workpiece section.

With the method in accordance with the invention the at least one fracture notch can be produced directly at the workpiece already located in preparation for the fracture-splitting during and/or (directly) after insertion of the expander means but still prior to the actual fracture-splitting action. Preferably, the fracture notch is finish-machined either during or after insertion of the expander means, although it is just as conceivable to configure during insertion only part of the fracture notch and to produce the other part once the expander means has been inserted partly or fully.

The additional step in producing the at least one fracture notch to be implemented in advance and making available a machining station solely provided for this purpose, as required in prior art, can be eliminated in the method in accordance with the invention in thus also eliminating the steps of removing the workpiece from the cited machining station and transferring and reclamping the workpiece in the clamping and supporting fixture used for fracture-splitting. This also does away with the need for any external buffering of the workpiece in the time period between producing the fracture notch and actual fracture-splitting.

Machining the workpiece up to and including the fracture-splitting procedure can now be considerably accelerated and simplified. The method in accordance with the invention permits by relatively simple and effective ways and means considerably rationalizing machining the workpiece whilst reducing the technical complications in producing the device. The method in accordance with the invention is applicable, for example, for both a) single workpiece having a single ring-shaped workpiece section, b) an axially aligned sequence of several single workpieces having a single ring-shaped workpiece section, c) one or more workpieces having several ring-shaped workpiece sections axially aligned in sequence, and d) for combinations of a)–c).

Further advantageous aspects of the method in accordance with the invention read from the corresponding sub-claims 2 to 9.

The objective forming the basis of the invention is furthermore achieved by a device in accordance with the invention having the features of claim 10.

This device for fracture-splitting a workpiece including one or more ring-shaped workpiece sections axially aligned in sequence comprises: at least one clamping and supporting fixture for locating the workpiece for fracture-splitting; at least one expander means for axial insertion into at least one bore formed by each ring-shaped workpiece section and expansion thereof; and at least one parting means arranged substantially at the circumference of the expander means and slaved in the movement thereof axially for producing at least one fracture notch in at least one bore during and/or after axial insertion of the expander means.

The parting means (which as regards its function in producing the fracture notch is not to be confused with the means provided for actual fracture-splitting of the workpiece) is preferably a parting means having at least one geometrically defined cutting edge, although it is understood that the invention is not restricted exclusively to this type of parting means. Just as well, the parting means may comprise geometrically non-defined cutting edges (e.g. as a grinding tool) or even configured as a parting means in which the parting action functions on the basis of thermal, chemical or electrochemical material removal, for example, in the scope of a spark erosion means or a laser cutting means and the like, whereby combinations of the individual parting means types are likewise conceivable.

In this arrangement, the parting effect of the parting means needed to produce at least one fracture notch is achievable during insertion of the expander means on which the parting means is arranged, for example by a relative movement between the parting means and the bore, on which the fracture notch is to be produced, produced due to the axially insertion movement or by a combined relative movement between the parting means, expander means and workpiece. In producing the fracture notch after insertion of the expander means, however, the position of the expander means relative to the bore remains preferably constant and merely a relative movement between the parting means and the corresponding workpiece surface and/or the stationary expander means is implemented. However, in both cases, advancing the parting means relative to the workpiece surface of the bore may involve components extending not only substantially parallel to the axial insertion direction but also at an angle thereto.

Since the parting means, as aforementioned, is arranged on the expander means, the expander means may expediently serve as a means of driving and/or advancing the parting means, although it is just as possible in the sense of the invention that the parting means is driven and/or advanced independently of the expander means.

The device in accordance with the invention offers the advantages as already detailed at the outset in conjunction with the method in accordance with the invention. By arranging the parting means on the expander means, the expander means has in addition an advantageous dual function by it functioning to a certain extent as a functional component of the parting means whilst taking over in conjunction therewith the additional function of an otherwise separately needed machining station for producing the fracture notch. Accordingly, the device in accordance with the invention is thus provided with a kind of combined fracture notching/splitting tool.

Further advantageous aspects of the device in accordance with the invention read from the corresponding sub-claims 11 to 19.

Preferred example embodiments of the invention including additional aspects and further advantages thereof will now be detailed with reference to the attached drawings.

DETAIL DESCRIPTION OF EXAMPLE EMBODIMENTS OF THE INVENTION

Figure 1:
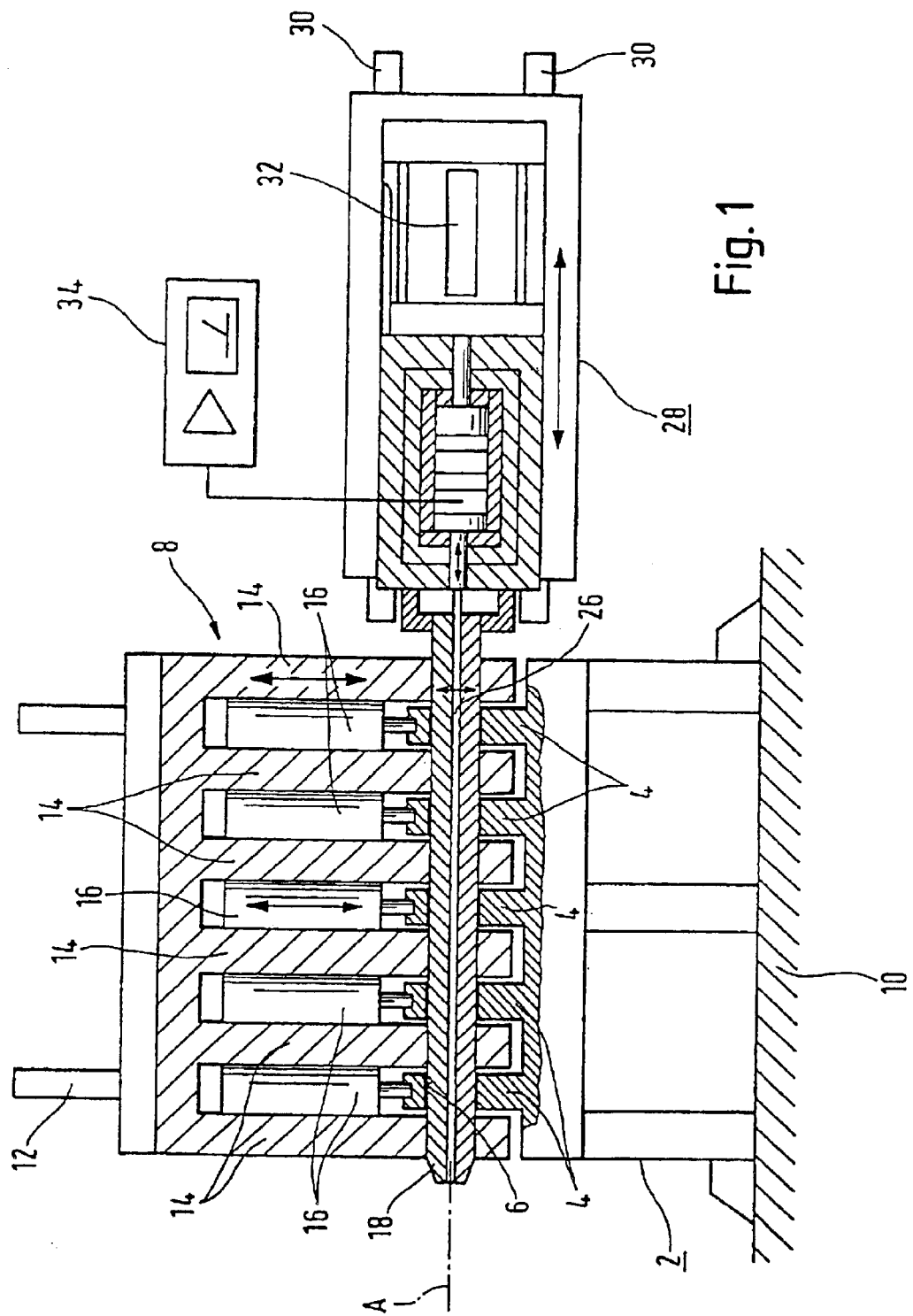
FIG. 1 is a greatly simplified diagrammatic cross-sectional view of a device in accordance with the invention for fracture-splitting a workpiece.

In the following description and Figures like parts and components are identified by like reference numerals to avoid tedious repetition, as long as no further differentiation is needed.

Referring now to FIG. 1 there is illustrated in a diagrammatic cross-sectional view a device in accordance with the invention for fracture-splitting a workpiece 2 configured comprising several ring-shaped workpiece sections 4 axially aligned in sequence. It is assumed that the workpiece 2 to be machined is a housing block 2 comprising five integrally configured ring-shaped workpiece sections 4 axially aligned in sequence, termed bearing caps 4 in the following, surrounding five bores 6 spaced away from each other in axial alignment, serving to mount crankshafts, camshafts or the like and having a common mounting axis A. The bearing caps 4 are to be separated from the remaining housing block 2 by fracture-splitting so that a macrostructured interlock materializes at the material face individual to each bearing cap 4 split from the remaining housing block 2 at a predefined fracture plane, resulting in an exact matching pairing between each bearing cap and its associated housing block section.

The device comprises a clamping and supporting fixture 8 with which the housing block 2 is located for fracture-splitting. The clamping and supporting fixture 8 includes a stationary lower workpiece mount 10 as well as a workpiece countermount 14 for advancing via a slide 12 at right angles to the mounting axis A and including a bearing cap support 16 likewise capable of being advanced at right angles to the mounting axis A. Advancing the workpiece countermount 14 and bearing cap support 16 is indicated in the drawing by the double arrows. To make for an uncluttered illustration, the corresponding advancing mechanisms which may feature hydraulic, electromechanical or other suitable positioners are not shown.

The device comprises furthermore an expander means including an elongated expanding or fracturing mandrel 18 insertable along the mounting axis A axially into the bores 6 and which is expandable for generating a fracture-splitting force as indicated in the drawing by a double arrow. The length of the fracturing mandrel 18 in the present case is dimensioned so that it extends through all bores 6 of the housing block in the inserted condition. The fracturing mandrel 18 comprises two fracturing mandrel halves as detained in the following.

Figure 2:
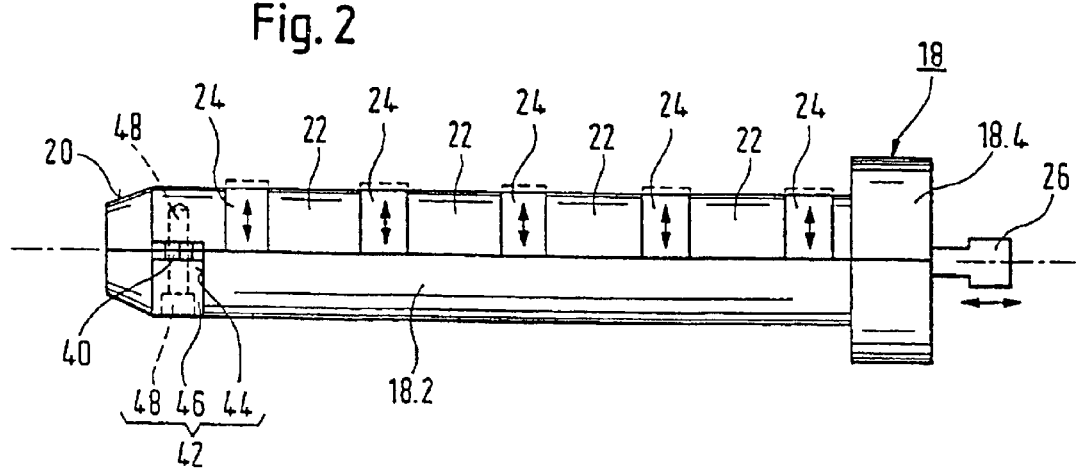
FIG. 2 is a diagrammatic side view of an expander means provided in the device as shown in FIG. 1 in a first embodiment.

Referring now to FIG. 2 there is illustrated a diagrammatic side view of the expander means in accordance with a first embodiment as provided in the device as shown in FIG. 1 depicting further details of the fracturing mandrel 18. The front end 20 of the fracturing mandrel 18 is configured slightly conical to facilitate insertion of the fracturing mandrel 18 into the bores 6. The outer circumference of the fracturing mandrel 18 is substantially circular. The outer diameter of the fracturing mandrel 18 is slightly smaller than the inner diameter of the bores 6. The first fracturing mandrel half 18.2 is configured continuous in its longitudinal extent, whereas the second fracturing mandrel half 18.4 has guide pieces 22 spaced away from each other axially which are located by the first fracturing mandrel half 18.2. Inserted between adjacent guide pieces 22 in each case is a movable fracturing segment 24 having a substantially semicircular outer contour, each fracturing segment 24 being assigned to each bearing cap 4 in its arrangement and function. A total of five fracturing segments 24 is thus provided in this case. The fracturing segment 24 can be moved in common by means of elongated fracturing segment actuating element 26 running between the two fracturing mandrel halves 18.2, 18.4 relative to the first fracturing mandrel half 18.2 radially, i.e. perpendicular to the mounting axis A (as indicated in FIG. 2 by the broken lines) to achieve the expansion effect of the fracturing mandrel 18 and a fracturing force at each bearing cap 4.

The end of the fracturing mandrel 18 facing away from the housing block 2 is connected to an advancing/actuating means 28 (cf. FIG. 1) with which the fracturing mandrel 18 can be inserted via a slide 30 for traveling in the mounting axis direction into the bores 6 axially and retracted on completion of fracture-splitting. This traveling action of the advancing/actuating means 28 and thus of the fracturing mandrel 18 is indicated in FIG. 1 by a double arrow. The drive means for these movements of the advancing/actuating means 28 are not shown to make for an uncluttered illustration. However, these may be a hydraulic, electromechanical or other suitable drive means. The advancing/actuating means 28 comprises furthermore an actuator 32 cooperating with the fracturing segment actuating element 26, the actuator 32 being coupled to a force sensing means 34 in ensuring a precisely defined fracturing force at each fracturing segment 24.

As evident from FIG. 2 the device in accordance with the invention furthermore comprises a parting means 36 arranged substantially at the circumference of the expander means, i.e. in this case, of the fracturing mandrel 18 and slaved in the movement thereof in the axial direction A. This parting means 36 produces two diametrally opposed fracture notches 38 in all five bores 6 of the housing block 2 during axially insertion of the fracturing mandrel 18.

Figure 3:
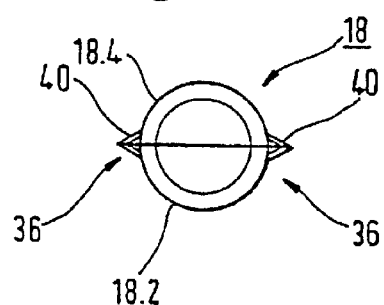
FIG. 3 is a diagrammatic front view of the expander means as shown in FIG. 2.
Figure 4:
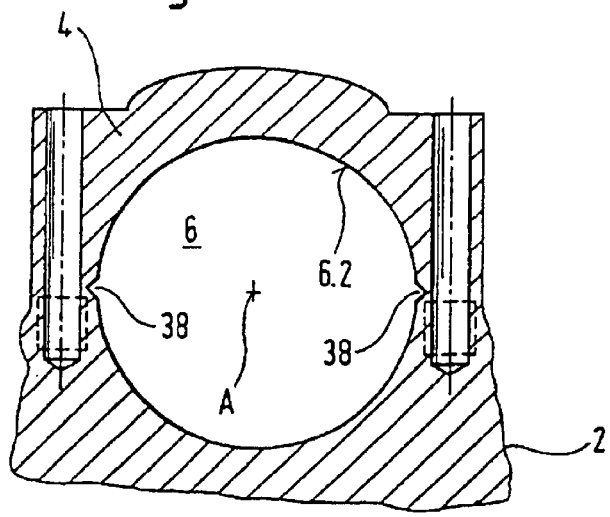
FIG. 4 is a diagrammatic cross-sectional view through a bearing cap portion of a housing block as shown in FIG. 1.

The position of the fracture notches 38 to be produced is evident from FIG. 4 illustrating a diagrammatic cross-sectional view of a bearing cap portion of the housing block 2 as shown in FIG. 1. It is to be noted that FIGS. 2, 3 and 4 are each scaled differently.

In the present example embodiment the parting means 36 is configured as broaching means 36 and comprises two broaches 40 arranged on a front section of the fracturing mandrel 18 relative to the axial insertion direction. These broaches 40 are positioned diametrally opposed at the circumference of the fracturing mandrel 18 in accordance with the arrangement and radial extent of the fracture notches 38 to be produced and extend by each of their cutting edges slightly beyond the circumference of the fracturing mandrel 18. This is particular evident in FIG. 3 showing a diagrammatic frontal view of the fracturing mandrel as shown in FIG. 2.

Relative to the longitudinal direction of the fracturing mandrel 18 too, i.e. in the direction of the mounting axis A, the two broaches 40 are located precisely opposite, although for certain applications they could just as well be arranged staggered in the longitudinal direction. The geometry of each cutting edge is adapted to the geometry of the fracture notch 38 to be produced.

In addition, the broaches 40 are configured like a throw-away insert as quick-change tools and each releasably or localized secured in a tool mount 42 in the front end portion of the fracturing mandrel 18 to facilitate replacement when worn, broken or needing maintenance. In this case the tool mount comprises a recess 44 for the broach 40, a clamping piece 46 and a bolting fixture 48 with which the clamping piece 46 can be urged into contact with the broach 40 in thus reliably securing it on the fracturing mandrel 18.

As a result of the arrangement as described above the fracturing mandrel 18 forms together with the broaching means 36 a combined broach/fracture tool and functions in this context simultaneously as tool mount and plunger for the broach 40.

The method in accordance with the invention for implementing by the device in accordance with the invention as described above for fracture-splitting a workpiece will now be explained.

Firstly, the workpiece to be machined, i.e. the housing block 2 which, as aforementioned, comprises five ring-shaped integral bearing caps 4 arranged axially aligned in sequence is located for fracture-splitting by means of the clamping and supporting fixture 8. For this purpose the housing block 2 is initially arranged by its side facing away from the bearing caps 4 on the stationary lower workpiece mount 10. After this, the workpiece countermount 14 and the bearing cap support 16 are advanced so that the housing block 2 is securely clamped in place for subsequent machining and the bearing caps 4 prevented from turning out of place during fracturing.

The fracturing mandrel 18, still in the non-expanded condition, is then inserted by means of the advancing/actuating means 28 traveling on the slide 30 into the bores 6 surrounded by each of the bearing caps 4, commencing with the bearing cap 4 shown on the right in FIG. 1, in the axial direction A. Due to the broaching means 36 fixedly arranged at the front end section of the fracturing mandrel 18, the fracturing mandrel 18 and the broaching means or its broaches 40 are located without any movement relative to each other. The relative movement between the workpiece 2 and broaches 40 needed for the broaching procedure is thus produced in the case of this present example embodiment by the axial movement of the fracturing mandrel 18 itself. By means of the broaches 40 slightly protruding radially, two diametrally opposed fracture notches 38 are thus broached in the inner circumferential surface 6.2 of each bore 6 during insertion of the fracturing mandrel 18. Whilst the fracturing mandrel 18 continues to advance axially through the bores 6 the fracture notches 38 are produced in one bore 6 after the other, until all five bores 6 have each been provided with two fracture notches 38. In the fully inserted condition the fracturing mandrel 18 is positioned as shown in FIG. 1, the fracturing segments 24 each being located precisely in the bore 6 of its bearing cap 4 assigned in each case.

Subsequently, the fracturing segments 24 are expanded by means of the actuator 32 and the fracturing segment actuating element 26 resulting in a fracture-splitting force being exerted on the bearing caps 4 controlled via the force sensing means 34. Once a critical stress is attained in the bearing caps 4 these are split substantially simultaneously from the remaining housing block 2, commencing at the fracture notches 38 serving as designed fracture locations and thus defining a predefined fracture plane. In this respect it is to be noted that depending on the configuration of the expander means or fracturing mandrel 18 it is, of course, just as possible to split the bearing caps 4 one after the other, this being particularly expedient when a large number of workpiece sections to be split is involved and/or the fracture-splitting force needs to be maintained low.

After fracture-splitting of the bearing caps 4 the fracturing segments 24 are retracted back into their starting position, after which the bearing cap support 16 is returned, the fracturing mandrel 18 withdrawn from the workpiece 2 and, in conclusion, the workpiece countermount 14 retracted. The machined housing block 2 can then be removed and the device componented with a new housing block 2 for a new cycle in the method.

Figure 5:
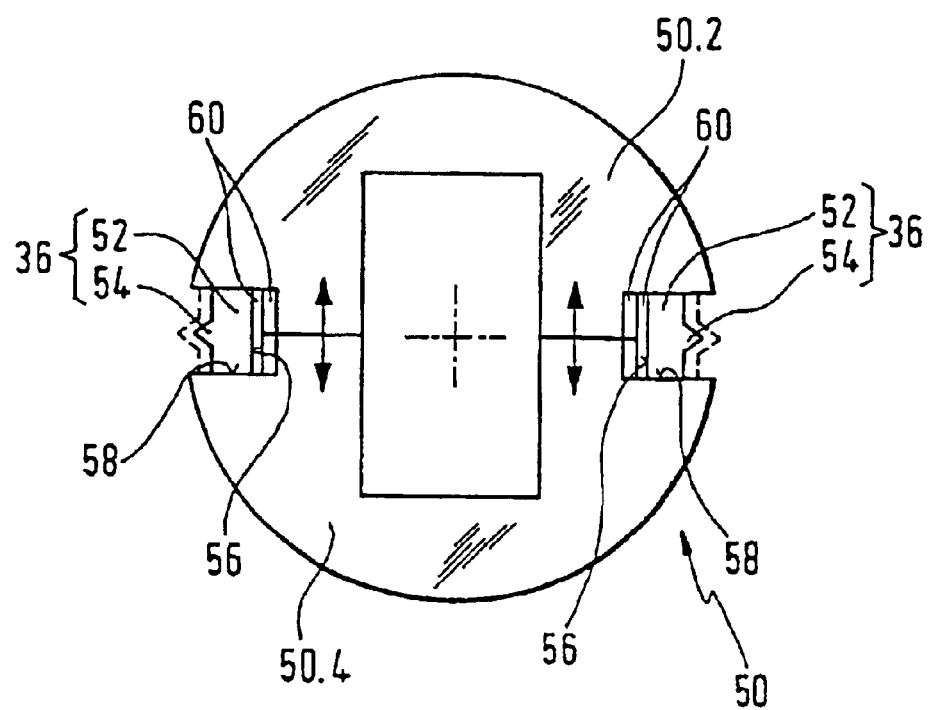
FIG. 5 is a greatly simplified diagrammatic cross-sectional view through an expander means for use in the device as shown in FIG. 1 in a second embodiment.

Referring now to FIG. 5 there is illustrated in a greatly simplified diagrammatic cross-sectional view a second embodiment of the expander means 50 for use in the device as shown in FIG. 1. This expander means 50 too, is configured in the form of a split fracturing mandrel 50 in having two fracturing mandrel halves 50.2 and 50.4 movable relative to each other radially relative to the bores 6 of the bearing caps 4. Unlike the variant as shown in FIG. 2 the broaching means 36 in this fracturing mandrel 50 is arranged movable relative thereto and extends in the longitudinal direction between the fracturing mandrel halves 50.2 and 50.4. The broaching means 36 comprises two diametrally opposed finger-shaped broaches 52 which as viewed in the cross-section of the fracturing mandrel 50 extend between the two adjacent fracturing mandrel halves 50.2 and 50.4 and substantially over the full length of the fracturing mandrel and are each movably reciprocated in the axial direction A (cf FIG. 1).

The side of a broach 52 facing the outer side of the fracturing mandrel 50 and thus the inner circumferential surface 6.2 of each workpiece bore 6 is provided with cutting edges 54, the geometry of which is adapted to the geometry of the fracture notch 38 to be produced. The rear side 56 of a broach 52 facing the inner side of the fracturing mandrel 50 is guided in a groove-type broach guide 58 formed by the fracturing mandrel halves 50.2 and 50.4. Relative to each bearing cap 4 of the housing block 2 the broach guide 58 comprises identical ramped longitudinal sections 60 matching corresponding ramped longitudinal sections 60 on the rear side 56 of the broach 52. In a starting position the two ramped longitudinal sections 60, 60 of the broach guide 58 and broach 52 are located on each other so that the cutting edges 54 of the broach 52 do not protrude beyond the radial circumferential surface of the fracturing mandrel 50. Once the broaches 52 are moved axially via an actuating mechanism (not shown), however, each broach 52 runs simultaneously on the ramped longitudinal sections 60, 60 slightly and evenly radially outwardly so that the cutting edges 54 are extended radially beyond the circumference of the fracturing mandrel 50 (indicated by the broken lines in FIG. 5) to thus become effective.

In a device in accordance with the invention comprising one such fracturing mandrel 50 the method in accordance with the invention can be implemented such that the fracture notches 38 are produced in each bore 6 (directly) after axial insertion of the fracturing mandrel 50. For this purpose the fracturing mandrel 50 as described above is firstly fully passed through all bores 6 until it has attained a position corresponding to that as shown in FIG. 1. After insertion, both broaches 52 are then simultaneously moved in the axial direction by means of the actuating mechanism, the cutting edges 54 of the broaches 52 extending radially outwardly to broach the two fracture notches 38 in each of all bores 6 substantially simultaneously as a result of the continuing axially movement (although, of course, it is just as possible to first actuate the one broach 52 and then the other). In this procedure there is not only a relative movement between the broaching means or its broaches 52 and the workpiece 2 but also between the broaching means or its broaches 52 and the fracturing mandrel 50. Once the fracture notches 38 have been produced, the broaches 52 can be retracted back into their withdrawn position and the bearing caps 4 fracture-split by the ways and means as described above and subsequently the fracturing mandrel 50 removed.

It is understood that the invention is not restricted to the example embodiments as described above which merely serve to explain the gist of the invention in general. Instead, the device in accordance with the invention may also assume embodiments other than those as described without departing from the scope of protection intended. In this respect the device and the method may comprise more particularly features representing a combination of the individual features as claimed as well as of the details as described in the example embodiments. Instead of the fracturing mandrel designs as described above it is, of course, just as possible to make use of some other suitable expander means, it being in addition possible to move the expander means and the parting means relative to each other also during insertion. In addition, combinations can in turn be produced from the variants as described above without departing from the scope of the present invention. The device in accordance with the invention may also comprise open and/or closed loop control means.

Reference numerals in claims, the description and drawings merely serve to better understand the invention and are not to be interpreted as restricting the scope of protection.

LIST OF REFERENCE NUMERALS 2 workpiece/housing block
4 ring-shaped workpiece sections/bearing caps
6 bore in 4
6.2 inner circumferential surface of 6
8 clamping and supporting fixture
9 workpiece mount of 8
12 slide of 8
14 workpiece countermount of 8
16 bearing cap support of 8
18 expander means/fracturing mandrel
18.2 first fracturing mandrel half
18.4 second fracturing mandrel half
20 front end of 18
22 guide pieces of 18
24 fracturing segments of 18
26 fracturing segment actuating element
28 advancing/actuating means
30 slide of 28
32 actuator
34 force sensing means
36 parting means/broaching means
38 fracture notches in 4 or 6
40 broaches of 36
42 tool mount
44 recess of 42
46 clamping piece of 42
48 bolting fixture of 42
50 expander means/fracturing mandrel
50.2 fracturing mandrel half
50.4 fracturing mandrel half
52 finger-type broaches
54 cutting edges of 52
56 rear side of 52
58 groove-type broach guides
60 ramped longitudinal sections of 52 and 58
A mounting axis/axial direction

What is claimed is:

1. A method for fracture-splitting a workpiece having one or more ring-shaped workpiece sections axially aligned in sequence comprising the steps:

locating said workpiece for fracture-splitting, axially inserting at least one expander means into at least one bore formed by each ring-shaped workpiece section, producing at least one fracture notch in at least one bore during or after axial insertion of said expander means by means of at least one parting means arranged on said expander means and slaved in the movement thereof in said axial direction, and expanding said expander means to fracture-split at least one ring-shaped workpiece section.

2. The method as set forth in claim 1, wherein said fracture notches of said bores of several ring-shaped workpiece sections are produced one after the other.

3. The method as set forth in claim 1, wherein said fracture notches of said bores of several ring-shaped workpiece sections are produced simultaneously.

4. The method as set forth in claim 1, wherein said expander means and said parting means are located relative to each other during axial insertion free of any relative movement.

5. The method as set forth in claim 1, wherein said expander means and said parting means are moved relative to each other during insertion.

6. The method as set forth in claim 1, wherein in producing said at least one fracture notch a relative movement is made between said expander means and said parting means after axial insertion of said expander means.

7. The method as set forth in claim 1, wherein several ring-shaped workpiece sections are fracture-split substantially simultaneously.

8. The method as set forth in claim 1, wherein several ring-shaped workpiece sections are fracture-split one after the other.

9. A method for fracture-splitting a workpiece having one or more ring-shaped workpiece sections axially aligned in sequence comprising the steps:

locating said workpiece for fracture-splitting, axially inserting at least one expander means into at least one bore formed by each ring-shaped workpiece section, producing at least one fracture notch in at least one bore during and after axial insertion of said expander means by means of at least one parting means arranged on said expander means and slaved in the movement thereof in said axial direction, and expanding said expander means to fracture-split at least one ring-shaped workpiece section.

10. The method as set forth in claim 9, wherein said fracture notches of said bores of several ring-shaped workpiece sections are produced one after the other.

11. The method as set forth in claim 9, wherein said fracture notches of said bores of several ring-shaped workpiece sections are produced simultaneously.

12. The method as set forth in claim 9, wherein said expander means and said parting means are located relative to each other during axial insertion free of any relative movement.

13. The method as set forth in claim 9, wherein said expander means and said parting means are moved relative to each other during insertion.

14. The method as set forth in claim 9, wherein in producing said at least one fracture notch a relative movement is made between said expander means and said parting means after axial insertion of said expander means.

15. The method as set forth in claim 9, wherein several ring-shaped workpiece sections are fracture-spilt substantially simultaneously.

16. The method as set forth in claim 9, wherein several ring-shaped workpiece sections are fracture-split one after the other.

* * * * *

UNITED STATES PATENT AND TRADEMARK OFFICE
CERTIFICATE OF CORRECTION

PATENT NO.    : 6,817,505 B2
DATED         : November 16, 2004
INVENTOR(S)   : Hahnel et al.

Page 1 of 1

It is certified that error appears in the above-identified patent and that said Letters Patent is hereby corrected as shown below:

Title page,
Item [62], Related U.S. Application Data, should read:
-- Division of application No. 09/965,319, now Pat. No. 6,698,637, which is a continuation of application No. PCT/EP00/03577, filed on April 19, 2000. --

Signed and Sealed this

Twenty-second Day of February, 2005

JON W. DUDAS
*Director of the United States Patent and Trademark Office*